E. G. JAY, Jr.
CHART DRUM FOR RECORDING APPARATUS.
APPLICATION FILED APR. 2, 1918.
1,272,960.
Patented July 16, 1918.
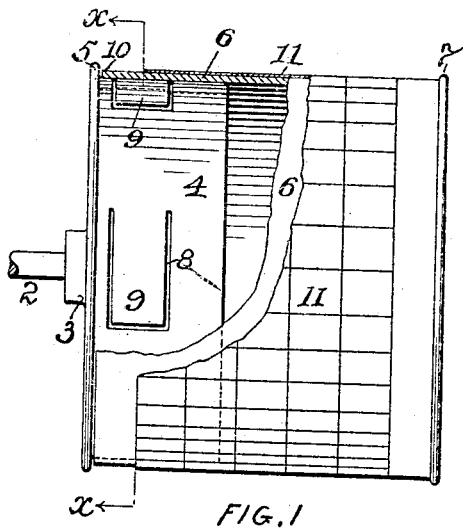
FIG. 1
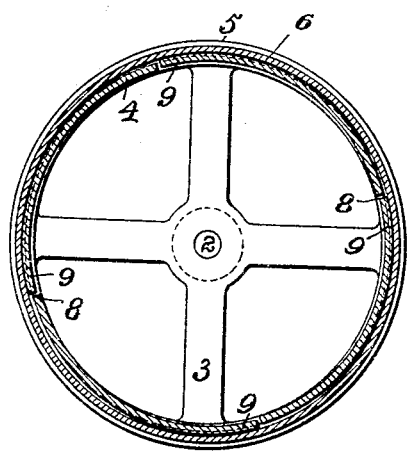
FIG. 2

UNITED STATES PATENT OFFICE.

EDWARD G. JAY, JR., OF PHILADELPHIA, PENNSYLVANIA, ASSIGNOR TO WARREN WEBSTER AND COMPANY, A CORPORATION OF NEW JERSEY.

CHART-DRUM FOR RECORDING APPARATUS.

1,272,960.  Specification of Letters Patent.  Patented July 16, 1918.

Original application filed August 4, 1917, Serial No. 184,506. Divided and this application filed April 2, 1918. Serial No. 226,167.

*To all whom it may concern:*

Be it known that I, EDWARD G. JAY, Jr., citizen of the United States, and resident of Philadelphia, county of Philadelphia, and State of Pennsylvania, have invented an Improvement in Chart-Drums for Recording Apparatus, of which the following is a specification.

My invention has particular reference to means for supporting record sheets for recording apparatus such as recording instruments for water meters, etc. This application is a division of my application, Serial No. 184,506, filed August 4, 1917, for improvement in registering and recording instrument for meters.

The object of my invention is to provide a simple and effective means for supporting the record sheet, whereby the said sheet may be quickly attached or removed or adjusted circumferentially to the supporting and operating means, to enable the chart to be initially adjusted under the pen or pencil, constituting the marker of the recording instrument.

In carrying my invention into effect, I provide a rotating driven member, having a circumferential flange, and combine therewith a chart carrying member in the form of a cylinder adapted to frictionally connect with the circumferential flange, whereby the chart carrying member may be adjusted circumferentially relatively to the said driven member and its driving shaft; the said parts being furthermore formed in such manner that the axis of the cylindrical chart carrying member is readily brought into axial alinement with the driving member which supports it.

My invention also consists of improvements hereinafter described whereby the above objects and results are attained, said improvements comprising certain organization and combination of parts which are fully described hereinafter and more particularly defined in the claims.

Referring to the drawings: Figure 1 is an elevation of the chart carrying drum and its supporting and driving means, with part in section; and Fig. 2, is a cross section of the same taken on the line $x$—$x$.

2 is a driving shaft and may be rotated in a continuous manner by any suitable mechanism. To the end of this shaft 2 is secured a head 3, which is provided with a circumferential flange 4 concentric with the axis of the shaft 2; and the head 3 has its perimeter extended beyond the circumferential flange 4 to form a shoulder, as indicated at 5, the purpose of which will be hereinafter described. The head 3 and the flange 4 thereof constitute in effect the supporting and driven member for the recording drum 6. This drum 6 is cylindrical and of slightly larger diameter than the diameter of the flange portion 4 of the driving member, so that it may fit the same as a sleeve which slides easily over the said flange. The depth of the flange member 4 is sufficiently great to provide adequate support for the cylindrical drum member 6. The flange 4, which receives the drum member is stamped at plurality of places (preferably four) as indicated at 8, and in such manner as to form tongues 9, which act as springs to press outward upon the inner surface of the drum, and thereby frictionally hold the drum 6 upon the flange wherever it may be circumferentially adjusted. The plane of the end 10 of the drum 6 is exactly at right angles to the axis of the drum, and this end fits up against the circumferential rib 5 upon the driven member 3, so that when the drum is pushed tightly upon the driving member 3, its axis is accurately brought into alinement with the axis of the driving member and its shaft, and consequently will run true. The outer end of the drum may be flanged at 7, so as to form a circumferential shoulder against which the record sheet 11 may be adjusted to insure the lines upon the record sheet lying in parallel alinement with the axis of both the driving member and the drum.

It will now be understood that the record sheet is first adjusted to the drum 6 by fitting it up against the shoulder 7 thereof, and then the drum with the record sheet upon it is forced upon the circumferential flange 4 of the driving member, and it is pressed home against the rib 5 to insure alinement. Assuming the recording mechanism to be at zero, the drum with its record sheet is then adjusted circumferentially about the flange 4 until the zero line on the record sheet comes under the pencil or marker (not shown.) In this manner the record sheet is quickly adjusted to proper position. Moreover, when a record sheet is to be replaced, the drum is easily slipped off the driving member, the record sheet removed, and after replacing it by a new sheet, the drum may be again applied to the driving member. The tongues 9 spring outwardly when the drum 6 is removed, and being on the flange, form no obstructions on the drum upon which the record sheet 11 may catch when it is being applied or removed on the drum. The drum 6 presents no obstructions to applying and removing the record sheet 11, and the same may be slipped over the drum or placed thereon in any suitable manner; and the record sheet may be also slipped off the drum when the record is completed, it being normally retained in position on the drum by friction.

The tongues 9, while pressed outwardly to form spring contacts with the drum, do not extend so far outwardly as to interfere with the freedom of applying the drum. The drum is easily applied by turning it in a left-hand direction, which will cause the end to press down the tongues and slip over them. By proper bending of the tongues 9 and thickness of the metal, the desired degree of friction may be had; and if desired, the width of these tongues may be greater or less to suit the particular degree of friction found most preferable.

It is manifest that we have here a driving member and a driven member, the latter comprising the chart carrying drum, and that these two members are frictionally connected by suitable friction tongues which are connected to one of the members and spring pressed upon the other member, and while I prefer that these tongues shall be attached to or integrally with the driving member, it will be manifest it would be effectively the same in operation, whether the tongues are attached to the driving or driven member. It suffices for the purposes of the invention that the friction creating tongues are secured to one of the members, and coacts with the other member.

It will now be apparent that I have devised a novel and useful construction which embodies the features of advantage enumerated as desirable, and while I have in the present instance shown and described the preferred embodiment thereof, which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. In a device of the character stated, the combination of a driving member having a circumferential flange, with a chart carrying drum supported by and circumferentially adjustable upon the driving member, and friction devices for holding the chart carrying drum in its adjusted position upon the flange of the driving member.

2. In a device of the character stated, the combination of a driving member having a circumferential flange, a chart carrying drum member of cylindrical form sleeved upon the circumferential flange of the driving member, and friction creating means between the drum and the circumferential flange of the driving member, whereby the drum may be adjusted circumferentially, said friction creating means comprising tongues secured to one of the members and spring pressed upon the other member.

3. In a device of the character stated, a driving member comprising a head having a circumferential flange concentric with the axis of the head, and also having a projecting portion beyond the flange, combined with a chart carrying drum of cylindrical form, sleeved upon the circumferential flange, and having its end adapted for adjustment against the projecting portion of the head to bring the drum into axial alinement with the head, and friction creating means between the drum and the flange comprising tongues secured to one of the parts and spring pressed against the other of the parts, whereby the drum and its chart may be circumferentially adjusted about the head, and also whereby the drum may be readily removed for replacing a record with a fresh sheet when necessary.

4. In a device of the character stated, a driving member having a circumferential flange provided at its flanged portion with a plurality of spring tongues pressing outwardly, combined with a chart carrying drum of cylindrical form, sleeved upon the circumferential flange of the driving member, and its tongues, whereby the drum may be normally driven with the driving member, and at the same time has capacity for circumferential adjustment relative thereto, and also freedom for removal and replacement when necessary.

In testimony of which invention, I hereunto set my hand.

EDWARD G. JAY, Jr.

Witnesses:
HERBERT K. BALL,
A. E. GEORGE.

Copies of this patent may be obtained for five cents each, by addressing the "Commissioner of Patents, Washington, D. C."